United States Patent [19]

Geiger et al.

[11] Patent Number: 5,099,465
[45] Date of Patent: Mar. 24, 1992

[54] COMPACT-DISC CHANGER WITH MAGAZINE AND PLAYBACK SECTION THAT ARE MOVABLE RELATIVE TO EACH OTHER

[75] Inventors: Erich Geiger, Unterkirnach; Peter Mahr, Königsfeld-Weiler, both of Fed. Rep. of Germany

[73] Assignee: Deutsche Thomson-Brandt GmbH, Hannover, Fed. Rep. of Germany

[21] Appl. No.: 299,805

[22] PCT Filed: May 3, 1988

[86] PCT No.: PCT/EP88/00366
 § 371 Date: Jan. 6, 1989
 § 102(e) Date: Jan. 6, 1989

[87] PCT Pub. No.: WO88/09033
 PCT Pub. Date: Nov. 17, 1988

[30] Foreign Application Priority Data

May 7, 1987 [DE] Fed. Rep. of Germany ....... 3715164

[51] Int. Cl.⁵ .................. G11B 17/22; G11B 17/26
[52] U.S. Cl. ........................ 369/36; 369/38; 360/92

[58] Field of Search ............... 369/34, 35, 36, 37, 369/38, 39; 235/381

[56] References Cited

U.S. PATENT DOCUMENTS 4,807,208  2/1989  Geiger ............... 369/34 X

Primary Examiner—Stuart S. Levy
Assistant Examiner—Kenneth B. Wells
Attorney, Agent, or Firm—Max Fogiel

[57] ABSTRACT

Compact disk changer with a playback section and a magazine with compartments for holding compact disks. The playback section and the magazine are moved relative to each other up and down for removing compact disks from the magazine. The compact disks are scanned optically in the magazine compartment to attain a predetermined relative position between the playback section and the magazine for the purpose of removing a selected disk. The compact disks in the compartments are detected by light conductors which extend into the magazine compartments. The disks have peripheral rims that do not reflect light.

10 Claims, 8 Drawing Sheets

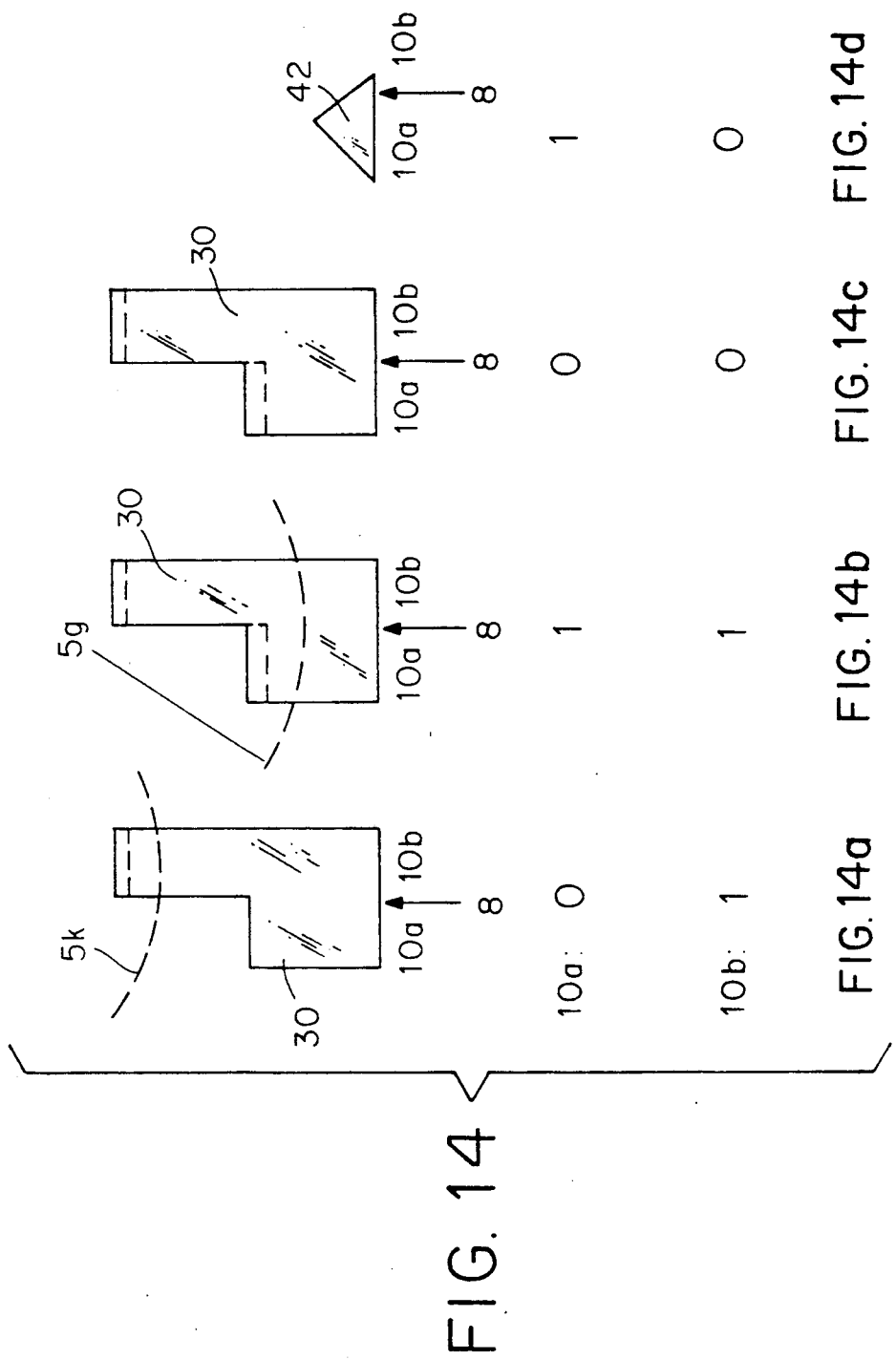

COMPACT-DISC CHANGER WITH MAGAZINE AND PLAYBACK SECTION THAT ARE MOVABLE RELATIVE TO EACH OTHER

BACKGROUND OF THE INVENTION

The invention concerns a compact-disk changer as recited in the preamble to claim 1.

A compact-disk changer, which can play various compact disks as desired, preferably includes a playback section with a drive mechanism, a pick-up, and signal-processing circuits as well as a magazine that accommodates a number of stacked compact disks. Between the playback section and the magazine are means of removing one of disks from the magazine as needed and positioning it ready to play in the playback section. Selecting a particular disk demands a relative motion between the playback section and the magazine in order to position the playback section in relation to the magazine such that the desired disk can be removed from the magazine. It is accordingly necessary to detect and control the position of the playback section in relation to the magazine.

SUMMARY OF THE INVENTION

The object of the present invention is to provide an especially simple method of positioning the playback section in relation to the magazine in a compact-disk changer of this type whereby the position can be detected essentially without physical contact.

The capacity to optically sense the disks inside the compartments of the magazine results in an especially simple and reliable system whereby the position of the playback section in relation to the magazine is detected essentially without physical contact and without massive moving parts. This feature is especially practical in a compact-disk changer for an automobile because the function of mechanically moved parts can be affected by the forces of acceleration that prevail in the vehicle. The invention advantageously exploits the reflective properties of a compact disk to detect the position of the playback section in relation to the magazine. No separate reflecting marks on the magazine are necessary. Another advantage is that, since a beam of light directed against a compartment that contains no disk is reflected only slightly or not at all, the playback section will not pause at that point to remove a disk from the magazine. When it is the sides of the disks that are sensed, it is also possible to insert compact disks of different diameters into the magazine.

BRIEF DESCRIPTION OF THE DRAWINGS

The invention will now be specified with reference to the drawings, wherein

FIGS. 5, 1 and 6 show various embodiments of the light conductor in FIG. 4, FIG. 14a is a schematic view of a recessed light conductor and reflector with only one receiver emitting a voltage and test results therefrom, FIG. 14b is a schematic view and illustrates another stage of test results from FIG. 14a with a plate of long diameter, FIG. 14c is a schematic view of another stage of test results from FIGS. 14a and 14b, with no disk present, and FIG. 14d is a schematic view of a still further stage with test results from FIGS. 14a to FIG. 14c, in accordance with the present invention.

Figure 1:
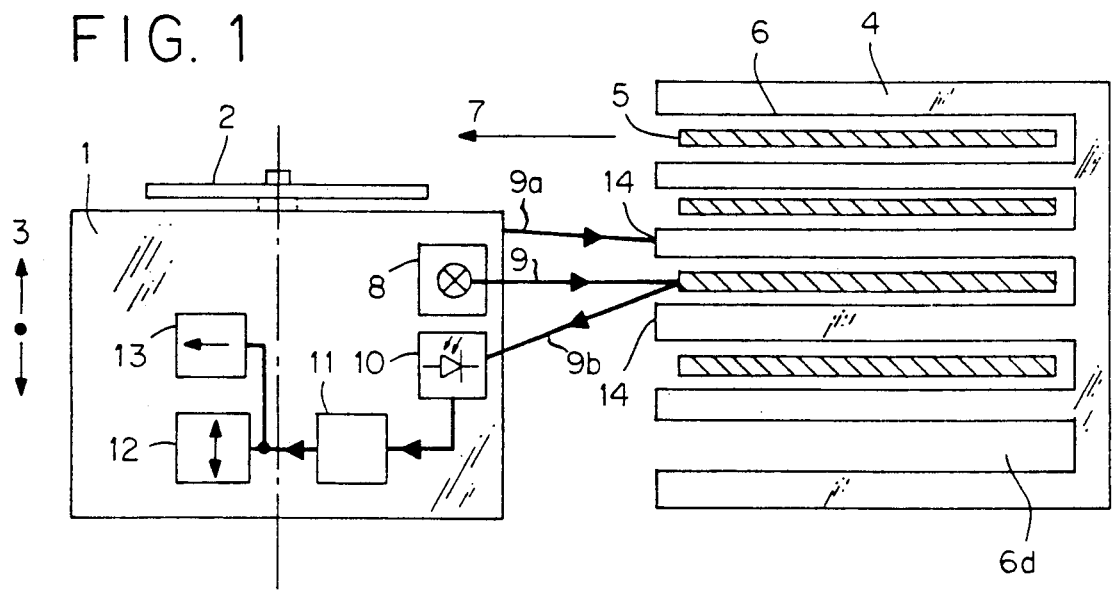
FIG. 1 illustrates the principle of optical scanning with a relative motion between the playback section and the magazine, FIG. 2 the specific design of a source of light and a photoelectric element, FIG. 3 a magazine in conjunction with two further developments of the invention, FIG. 4 a magazine accommodating disks that are sensed at the side.

The playback section 1 illustrated in FIG. 1 is positioned such that it can be displaced along with its turntable 2 in the directions indicated by arrow 3 relative to a stationary magazine 4 in order to remove various compact disks 5 from individual compartments 6 as desired. One compact disk 5 at a time is removed from or conveyed out of magazine 4 by unillustrated means, a slide controlled by a Bowden cable for example, and supplied to turntable 2 in the direction indicated by arrow 7. It is also possible for disk player 1 to be stationary and the magazine to move.

Playback section 1 contains a source 8 of light that directs a beam 9 onto the left-hand wall of magazine 4. Also accommodated in playback section 1 are a photoelectric element 10, a control circuit 11, a drive mechanism 12, and a control stage 13 for removing a compact disk 5 in the direction indicated by arrow 7 (or for triggering a mechanism that conveys the disk).

When playback section 1 moves in the direction indicated by arrow 3 in order to remove a particular disk 5 from magazine 4, the beam of light initially strikes the dark front wall 14 of the magazine for example as represented by beam 9a. Since wall 14 is black or non-reflecting, beam 9a is reflected only weakly if at all. Thus, little or no light arrives on photoelectric element 10, and control circuit 11 will ensure that drive mechanism 12, which governs the motion of playback section 1 in the direction indicated by arrow 3, remains on and control stage 13, which removes a disk 5 in the direction indicated by arrow 7, remains off and inactive. Playback section 1 (or, in the other version, magazine 4) can travel on, in the direction indicated by arrow 3 for example, to select a particular disk 5.

Once playback section 1 has arrived in a position relative to the magazine that is appropriate for removing a disk 5, beam 9 of light will strike the reflecting outer edge of the disk, generating a reflected beam 9a that arrives on photoelectric element 10. Playback section 1 is accordingly activated such that the mechanism 12 that governs motion in the direction indicated by arrow 3 is switched off and the control stage 13 that governs the removal of a disk 5 is switched on. The reflection of beam 9 of light from the edge of a disk 5 is accordingly exploited as a criterion to indicate that playback section 1 is in an appropriate position for removing a disk. When beam 9 of light, however, strikes a chamber 6d that does not contain a disk, there is again no adequate reflection and the control stage 13 that governs the removal of a disk is not activated.

Figure 2:
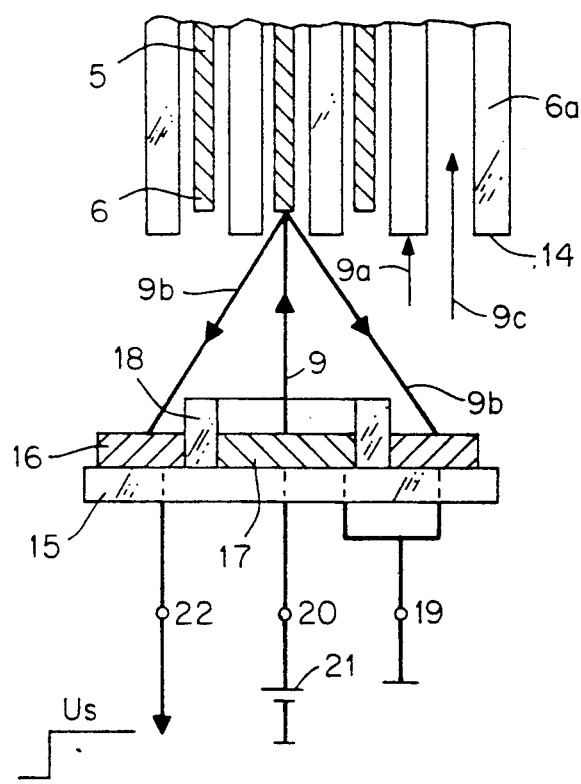

FIG. 2 illustrates a component that comprises both a source 8 of light and a photoelectric element 10. A semiconducting section in the form of an annular photoelectric cell 16 is mounted on a semiconducting substrate 15. Accommodated on substrate 15 and in the space inside photoelectric cell 16 is a semiconductor in the form of a light-emitting gallium-arsenide diode 17. Between photoelectric cell 16 and light-emitting diode 17 is an annular shield 18. Photoelectric cell 16 and light-emitting diode 17 have a common grounded connection 19. Connected to the second connection 20 of diode 17 is a battery 21 that illuminates the diode and generates beam 9 of light. Reflected beam 9b strikes annular photoelectric cell 16 and generates a voltage Us at terminal 22 that is processed in control circuit 11 as illustrated in FIG. 1. Annular shield 18 prevents the light leaving light-emitting diode 17 from arriving directly on photoelectric cell 16. The system is described in greater detail in German Patent 2 425 855.

Figure 3:
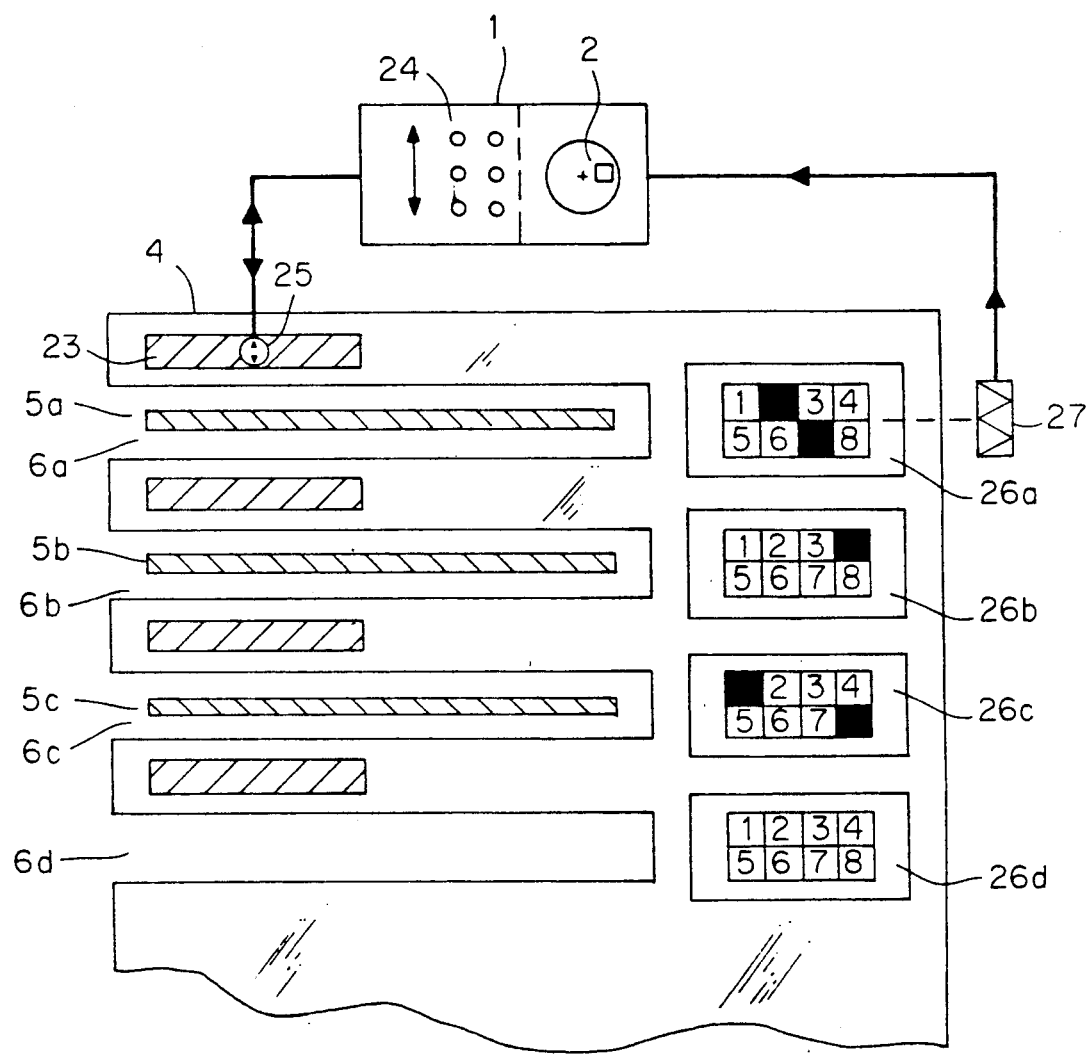

FIG. 3 illustrates a magazine 4 with two characteristics in addition to those illustrated in FIGS. 1 and 2.

Associated with each disk compartment 6a through 6d is a read-and-write memory in the form of a magnetic strip 23. The address of the disk 5a in compartment 6a can be entered into magnetic strip 23 by way of buttons 24 on playback section 1 in conjunction with sensor 25. Magnetic strip 23 will accordingly contain the address of the disk 5a in compartment 6a. The remaining compartments 5b-d are similar in design. To play a particular disk 5, its address is entered in playback section 1 by way of buttons 24. Sensor 25 reads magnetic strip 23 while playback section 1 moves relative to magazine 4 as illustrated in FIG. 1. Once the address read out of magnetic strip 23 agrees with the address entered by way of buttons 24, playback section 1 will stop moving in the direction indicated by arrow 3 in FIG. 1 and a disk 5 is removed from compartment 6. Thus, buttons 24, which can in an automobile be located remote from playback section 1 and magazine 4, can be activated to selected any desired disk 5 for playback in playback section 1. Instead of a magnetic strip 23, other types of memory, optical or solid-state for example, that an address can be entered into, that can be read to determine an address, and that can be erased to accommodate another address can be employed.

Memories of this type for the entry and determination of cassette addresses are described in German OS 2 943 409 for example.

FIG. 3 also illustrates a matrix 26 of numbers 1 through 8 associated with each compartment 6. These numbers represent the individual long or short pieces of music recorded on each disk 5. There are actually more than eight numbers. The operator marks, with a black pencil for example, the numbers of the pieces on disk 5 that he would like to listen to as represented by the black squares in the matrix. When a disk 5a is supplied for playing to playback section 1, the matrix is scanned by an opto-electric sensor 27 and the result stored in playback section 1. The sensing advance of playback section 1 is limited by appropriate controls in such a way that only the marked pieces 2 and 7 will be played and the intermediate pieces will be skipped during rapid search with very short pauses on the order of one or two seconds. Similarly, only piece 4 on disk 5b and only pieces 1 and 8 on disk 5c will be played. None of he numbers in matrix 26d is marked because compartment 6d contains no disk.

Combining the system of addresses stored in magnetic strip 23 with the processing of the marked numbers in matrices 26 accordingly makes it possible to play any desired pieces of music on any desired compact disk 5 in any desired order. Playback section 1 will also preferably include a memory for storing the addresses of the compact disks 5 that are conveyed one after another to playback section 1 in order to allow the pieces marked in the matrices for each disk to be played.

A magazine 4 can also be assembled from separate holders, each containing one disk. Compact disks for example are each accommodated in a separate housing open at one edge, and the individual housings or holders can be snapped or otherwise locked together into a magazine 4.

Figure 4:
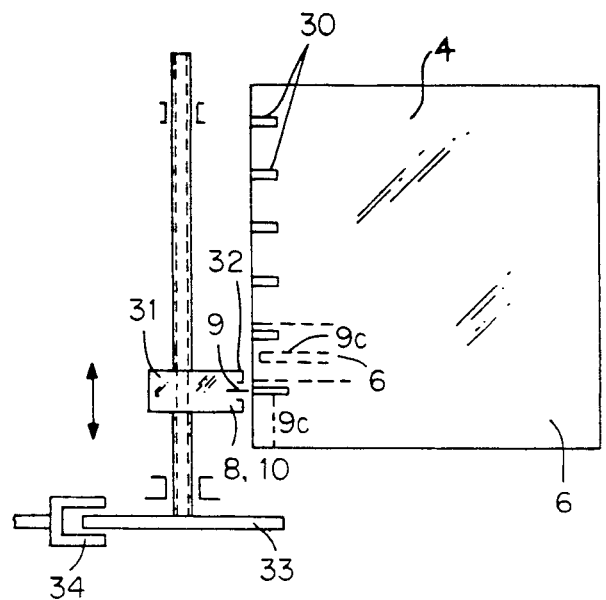

FIG. 4 illustrates another version of the system illustrated in FIG. 1. A light conductor 30 is associated with each compartment 6 in magazine 4. Light conductors 30 conduct a beam 9 of light generated by an external source 8 into compartment 6 and divert a beam 9c onto the side of disk 5. The light conductor can for this purpose be provided with one or more reflecting areas or can be angled toward the side of disk 5 such that the area that the light emerges from is simultaneously the area in which the light enters. The beam reflected from the side of disk 5 is again intercepted by light conductor 30 and conveyed to photoelectric element 10. Source 8 of light and photoelectric element 10 are mounted on an optics support 31 that is preferably rigidly secured to the playback section (1 in FIG. 1) and can accordingly move up and down. Light conductor 30 is positioned in relation to optics support 31 such that, once a prescribed position has been attained, the playback section will be adjusted for the disk 5 just arrived at. Associated with source 8 of light is a diaphragm 32 that enables fine adjustment. Another means of fine adjustment illustrated in FIG. 4 is a wheel 33 that is rotated or moved by optics support 31 as the support travels up and down and that operates in conjunction with an incremental generator in the form of a sensor 34. The number of rotations of wheel 33 is a measure of the level at which optics support 31 is located.

Figure 5:
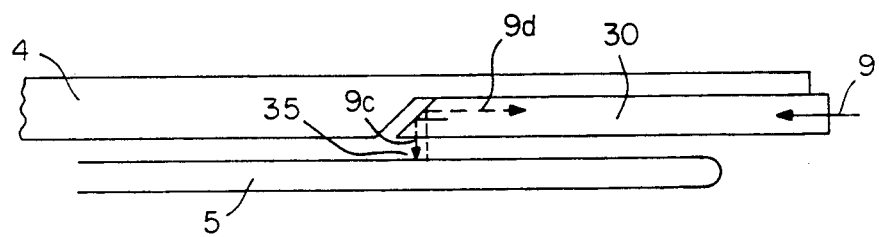

FIG. 5 illustrates a light conductor 30 with a reflecting point 35 at one end and a disk 5 below it. Beam 9 of light is diverted down at the end of light conductor 30 onto the side 35 of disk 5, whence it is reflected. If the side is sufficiently reflective, the reflected beam 9d will arrive at photoelectric element 10 (FIG. 1) by way of light conductor 30. Since disk 5 has both a reflecting and a non-reflecting or poorly reflecting side, the procedure that stops the upward or downward motion of the playback section will be activated only when the disk is correctly inserted.

Figure 6:
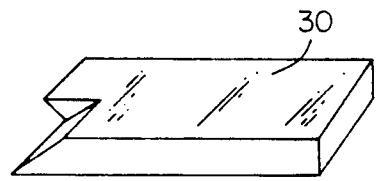

FIG. 6 illustrates a light conductor 30 with several reflecting areas.

Figure 7A:
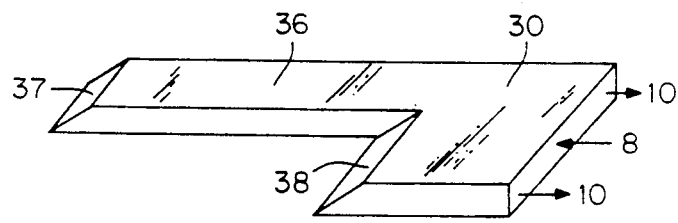
FIG. 7a is a perspective view and illustrates a further embodiment of a light conductor with a leg.
Figure 7B:
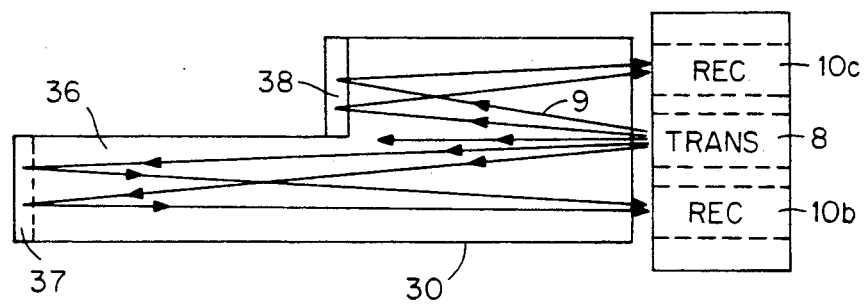
FIG. 7b is a schematic view of the light conductor of FIG. 7a and shows the light paths therethrough, FIG. 8 curves relative to the sensing of large and small compact disks, FIG. 9 a holder component for a disk compartment that is assembled into a magazine, FIG. 10 a development of the magazine with an additional point of reflection for each compartment, FIG. 11 a reflecting component, FIG. 12 a magazine with sliding disk holders, FIG. 13 the top of a magazine compartment with an inner holder.

FIGS. 7a and 7b illustrate a light conductor 30 with a leg 36 that has a reflecting area 37 extending into the vicinity of small compact disks 5 and another reflecting area 38 that detects only larger compact disks 5. The reflecting areas are mutually displaced such that the dimension of the reflected and detected light makes it possible to determine whether one or all of the reflecting areas have obtained reflected light. A light conductor of this type makes it possible to distinguish between correctly positioned large disks 5, correctly positioned small disks 5, incorrectly positioned disks, and empty compartments 6.

Figure 8:
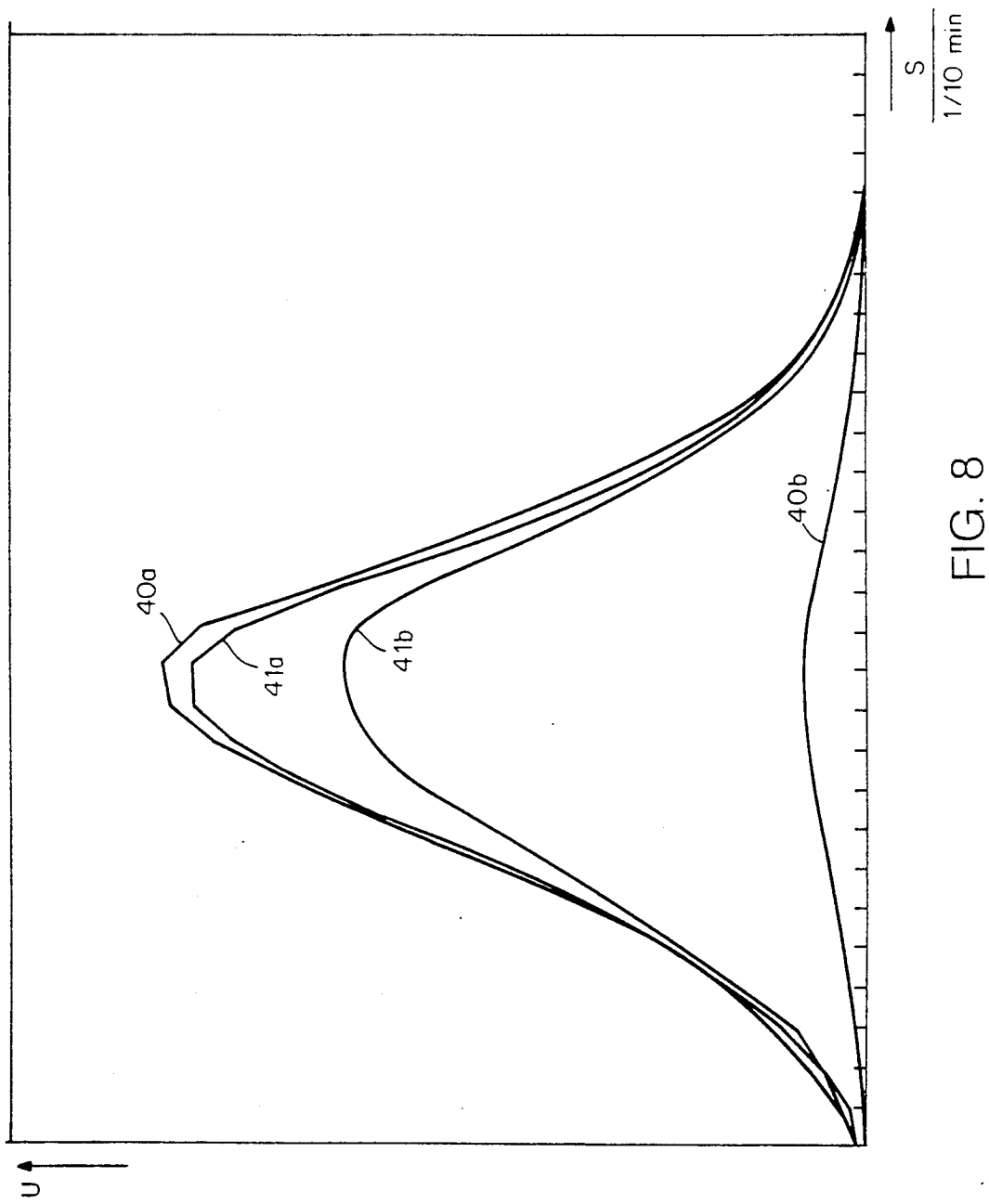

The curves in FIG. 8 represent the results of tests with a light conductor 30 of the type illustrated in FIG. 7, whereby a search device 8 supplies a beam 9 of light to light conductor 30 such that it strikes both reflecting areas 37 and 38. If any light is reflected, it is detected by several photoelectric elements (receivers) 10 associated with the individual reflecting area. Receiver 10a obtains reflected light only from leg section 38, and receiver 10b only from leg 36. If disk 5 is small, only receiver 10b will obtain reflected light whereas, if the disk is large, both receivers 10a and 10b will obtain reflected light because there will be reflecting material from the disk under both reflecting areas. The curves 40a and 40b in FIG. 8 represent the light detected in conjunction with a small disk, which accordingly obtains light only from long leg 36. Receiver 10a also simultaneously obtains only a little light. Curves 41a and 41b represent the results for light reflected from reflecting areas 37 and 38 in conjunction with large disks. Curve 41b is accordingly larger than curve 40a because both areas 37 and 38 are reflecting light from large disks. The signal from receiver 10b indicates whether a disk has been inserted at all. This also ensures correct positioning. The difference between curve 40a, 41a, and 41b is of no significance and derives from properties of the components. The up and down motions can accordingly be correctly adjusted in accordance with the threshold to the compartments 6 that contain disks 5. The results can be made even more precise by using several beams 9 of light or several photoelectric elements 10. The reflected light can also be exploited to indicate whether the disk has been duly returned to its compartment 6 after being played.

Figure 9:
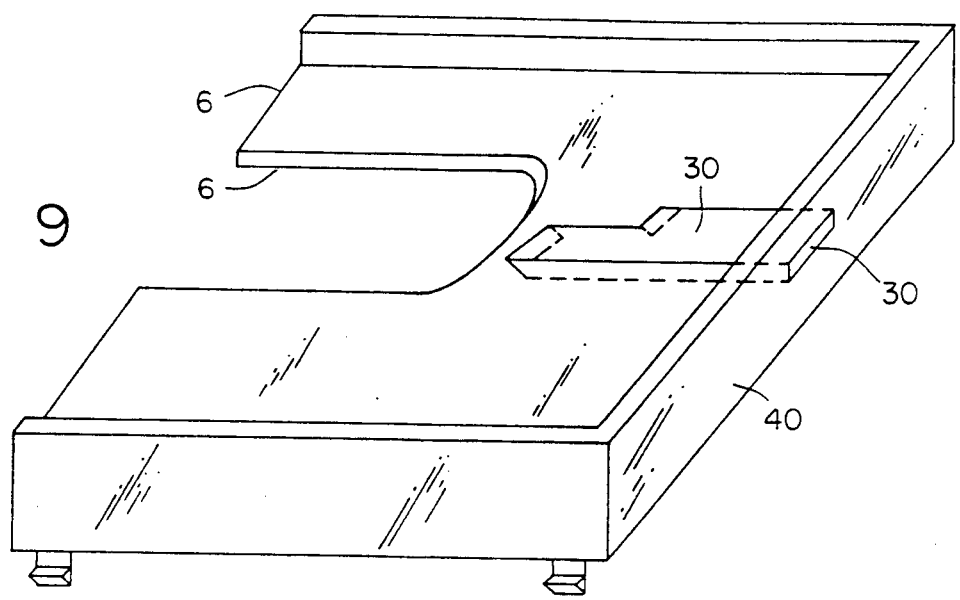

FIG. 9 illustrates a holder 40 designed on the snap-on principle that can be employed to assemble a magazine 4 with almost any desired number of compartments 6.

Figure 10:
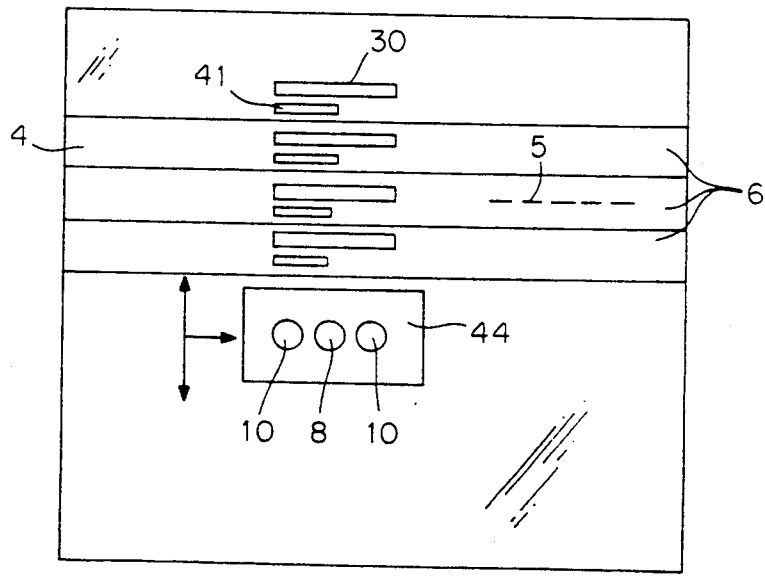

FIG. 10 illustrates the outside of a magazine 4 with light conductors 30 for obtaining a signal controlling the up and down motions of parts 1 and/or 4. This system also includes additional stationary reflecting areas 41 for beam 9 of light. Reflecting areas 41 are a measure of the number of compartments 6 present. It would be impossible to detect empty compartments 6 without these reflecting areas. If, for example, only the first, second, and fourth of four contiguous compartments 6 in FIG. 1 contain a disk 5 and not the third, the disk in the fourth compartment would be misinterpreted as a disk in the third. To obtain correct information with respect to empty compartments as well, the light reflected from every compartment is processed. Reflecting areas 41 can in certain situations be flat mirrors, of reflecting foil for example. Associated with the visible light conductors 30 emerging from the individual compartments 6 and with reflecting areas 41 is an optics support that moves up and down and has a source 8 of light and a light receiver 10 mounted on it. Optics support 44 can be rigidly secured to playback section 1 and move along with it. Since, however, source 8 of light and light receiver 10 are dimensioned and positioned in relation to light conductor 30, it cannot in some circumstances be guaranteed that beam 9 of light will arrive at receiver 10 when reflected from area 41 when the mirror is flat.

Figure 11:
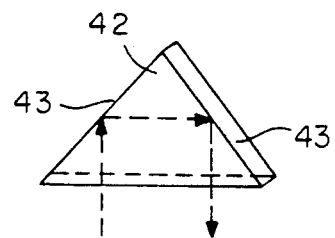

FIG. 11 illustrates a reflecting component 42 with a reflecting area 43 that is ideal for this situation. The shape of reflecting area 43 ensures that the beam of light from emitter 8 will arrive at receiver 10.

Figure 12:
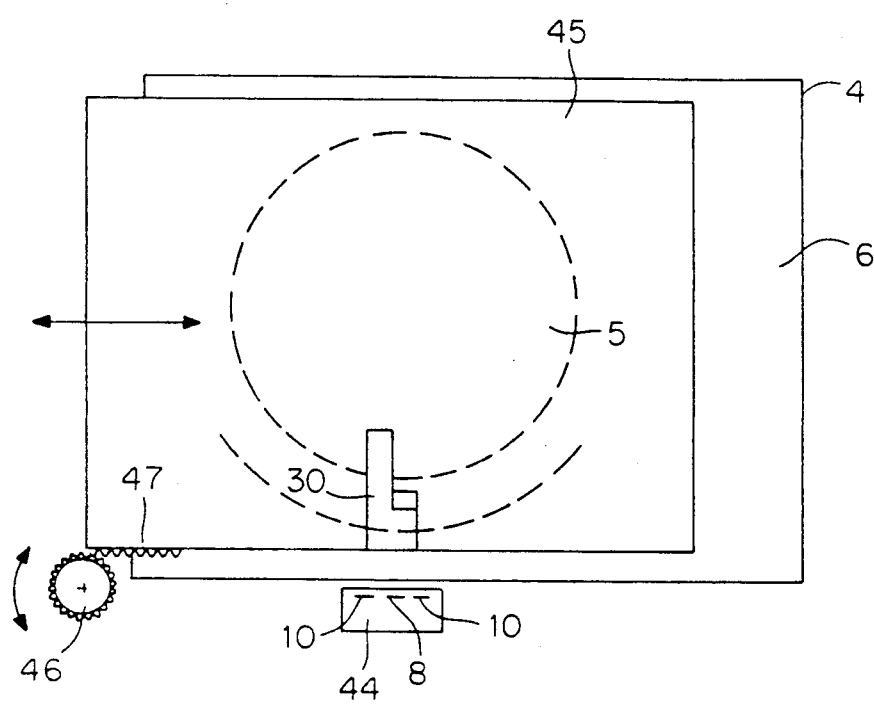

FIG. 12 is a top view of a compartment 6 in magazine 4 with a sliding holder 45 in the compartment. A light conductor or light conductors 30 that operate in conjunction with optics support 44 are positioned on holder 45. Holder 45 moves out of compartment 6 and into the playing position along with disk 5, also entraining light conductor 30, which accordingly travels out of the range of illumination of optics support 44. If, accordingly, once a disk has been played, holder 45 is inserted back into compartment 6, the arrival at the horizontal limiting position of optics support 44 can be detected and exploited. The in and out motions of holder 45 are governed by a rack 47 and pinion 46.

Figure 13:
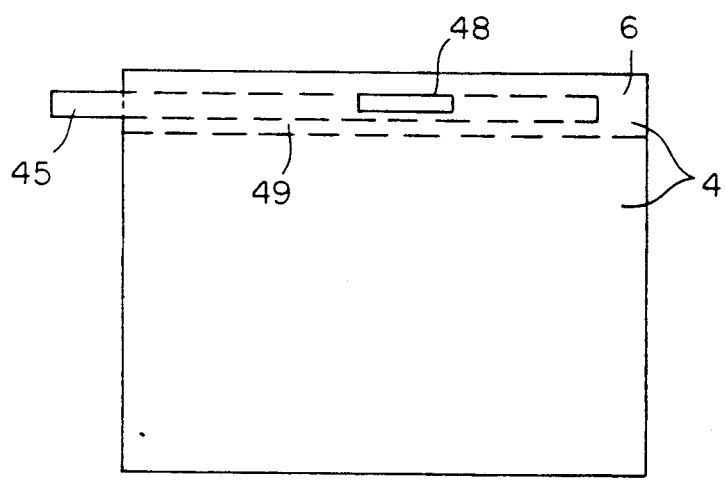

FIG. 13 is a side view of compartment 6 and inner holder 45. A window 48 in the wall of magazine 4 determines the light communication between optics support 44 and light conductor 30. A track 49 that positions each holder 45 in magazine 4 or compartment 6 is provided.

FIGS. 14a through 14d represent four different stages of test results from a recessed light conductor 30 and a reflector 42, with which are associated an (unillustrated) light emitter 8 and two light receivers 10. The beam of light in FIG. 14a is emitted from an unillustrated emitter 8 to a (small) disk 5k, a disk with a diameter of 7.6 cm for example, whence it is reflected to receiver 10b. FIGS. 14a through 14d represent receivers 10a and 10b below a light conductor 30, with voltages generated in the two receivers indicated by a "yes" (1) or "no" (0) at the bottom. In FIG. 14a, only receiver 10b is emitting a voltage. The plate 5g in FIG. 14b has a long diameter. Both receivers 10a and 10b are emitting voltage. No disk 5 is present in FIG. 14c, and neither receiver 10a or 10b is emitting voltage. The reflector 42 in FIG. 14d occasions voltage in receiver 10a but not in receiver 10b and can accordingly differ from the signals from light conductor 30, where a signal from receiver 10b is to be expected whether the disk is large or small.

We claim:

1. A compact disc changer comprising: a playback section; a magazine with compartments for holding compact discs; means for moving said playback section and said magazine relative to each other up and down for removing compact discs from said magazine; means for scanning optically the compact discs in said magazine compartments to attain a predetermined relative position between said playback section and said magazine for removing a selected disc; and light conductors extending into said magazine compartments for detecting compact discs in said compartments with peripheral rims that do not reflect light.

2. A compact disc changer as defined in claim 1, wherein said light conductors have at least two light-emergence points in a magazine compartment, one of said points being located at a center of a disc, and the other of said points being located at an edge of the disc.

3. A compact disc changer as defined in claim 1, wherein a light conductor is associated with each magazine compartment; a source of light transmitting light through said light conductor; said light conductor diverting said light transmitted by said source onto a lateral surface of a disc; photoelectric means, said light conductor intercepting light reflected from the disc and supplying the reflected light to said photoelectric means.

4. A compact disc changer as defined in claim 1, wherein said magazine is stationary; said playback section being movable relative to said stationary magazine for removing compact discs.

5. A compact disc changer as defined in claim 1, including a memory element associated with each compact disc compartment in said magazine, each individual compact disc having a code entered into the respective memory element, said code being readable out by said playback section for controlling removal of a disc.

6. A compact disc changer as defined in claim 1, including a matrix that can be marked by hand associated with each compartment in said magazine, said matrix can be marked in relation to recorded pieces on a disc; reading means for scanning said matrix to control said playback section for playing marked pieces.

7. A compact disc changer as defined in claim 1, wherein said magazine comprises a plurality of individual holders, each holder containing a disc.

8. A compact disc changer as defined in claim 7, wherein each holder has a surface for supporting a disc, each holder having also lateral edges for attaching to adjacent holders.

9. A compact disc changer as defined in claim 1, wherein said light conductors are embedded in a surface supporting a compact disc, said light conductors having light-emergence points; and light-diverting mirrored surfaces at said light-emergence points.

10. A compact disc changer comprising: a playback section; a magazine with compartments for holding compact discs; means for moving said playback section and said magazine relative to each other up and down for removing compact discs from said magazine; means for scanning optically the compact discs in said magazine compartments to attain a predetermined relative position between said playback section and said magazine for removing a selected disc; and light conductors extending into said magazine compartments for detecting compact discs in said compartments with peripheral rims that do not reflect light; said light conductors having at least two light-emergence points in a magazine compartment, one of said points being located at a center of a compact disc and the other point being located at an edge of said compact disc; each magazine compartment being associated with a light conductor; a source of light transmitting light through said light conductor, said light conductor diverting said light onto a lateral surface of a compact disc; a photoelectric element, said light conductor intercepting light reflected from a compact disc and supplying the reflected light to said photoelectric element; said magazine being stationary, said playback section being movable relative to said stationary magazine for removal of compact discs; a memory element associated with each compact disc compartment in said magazine, each individual compact discs having a code entered into said memory element, said playback section reading out said code for controlling removal of a disc; a matrix associated with each magazine compartment and being marked by hand dependent on recorded pieces on a disc; reading means for scanning said matrix and controlling said playback section to play pieces marked on said matrix; said magazine being comprised of individual holder, each holder containing a compact disc; each holder having a surface supporting a compact disc and having lateral edges for attaching to adjacent holders; light-diverting mirrored surfaces, said light conductors having light-emergence points at said light-diverting mirrored surfaces, said light conductors being embedded in a surface supporting a compact disc.

* * * * *